United States Patent [19]

Patel et al.

[11] 4,324,592

[45] Apr. 13, 1982

[54] CARTRIDGE CONTAINING FAST ACTING INORGANIC ADHESIVE SYSTEMS, GROUTING COMPOSITIONS AND METHOD OF USE

[75] Inventors: Natvarlal K. Patel, Warrensville Heights; Anthony C. Plaisted, North Royalton, both of Ohio

[73] Assignee: Celtite, Inc., Cleveland, Ohio

[21] Appl. No.: 102,065

[22] Filed: Dec. 10, 1979

[51] Int. Cl.$^3$ .............................................. C04B 9/04
[52] U.S. Cl. .................................... 106/85; 106/105; 106/121; 206/219; 206/524.1; 206/568; 405/260
[58] Field of Search ................. 106/85, 105, 121; 206/219, 524.1, 568; 405/260

[56] References Cited

U.S. PATENT DOCUMENTS

| | | | |
|---|---|---|---|
| 3,285,758 | 11/1966 | Limes et al. | 106/58 |
| 3,821,006 | 6/1974 | Schwartz | 106/85 |
| 3,879,209 | 4/1975 | Limes et al. | 106/58 |
| 3,923,525 | 12/1975 | Toeniskoetter et al. | 106/85 |
| 3,923,534 | 12/1975 | Cassidy | 106/85 |
| 3,960,580 | 6/1976 | Stierli et al. | 106/85 |
| 4,126,003 | 11/1978 | Tomic | 106/89 |
| 4,126,005 | 11/1978 | Coursen | 106/89 |
| 4,127,001 | 11/1978 | Tomic | 106/90 |
| 4,152,167 | 5/1979 | Horvitz et al. | 106/85 |

FOREIGN PATENT DOCUMENTS 2603851  3/1979  United Kingdom .

*Primary Examiner*—James Poer
*Attorney, Agent, or Firm*—Caesar, Rivise, Bernstein & Cohen, Ltd.

[57] ABSTRACT

A cartridge containing fast acting inorganic adhesive system, grouting compositions and method of use comprising in the preferred embodiment first and second components which are separately maintained as in a two component cartridge until just prior to use. The first component comprises a paste which includes magnesium oxide, a dispersing agent, such as a ligno sulfonate and water. The second component is comprised of a dihydrogen phosphate salt, such as mono hydrogen ammonium phosphate or sodium dihydrogen phosphate, and the combination of a trisodium phosphate and a second agent selected from the group consisting of a polyphosphate salt and an alkyl acid phosphate or both. The second component will also include a minor amount of water to make the paste.

26 Claims, No Drawings

CARTRIDGE CONTAINING FAST ACTING INORGANIC ADHESIVE SYSTEMS, GROUTING COMPOSITIONS AND METHOD OF USE

This invention relates to cartridge containing fast acting inorganic adhesive systems and method of use, and more particularly to new and improved Inorganic Adhesive Systems, Grouting Compositions and Method of Use which achieve a fast acting bond for bolts in the mining and construction industries with the bond being extremely strong.

STATEMENT OF INVENTION

The present invention relates to a multi-component grouting composition preferably presented in a two compartment cartridge for use in combination with a reinforcing bar for anchoring purposes. When mixed together, the multi-component system sets rapidly to a cementitious mass and is characterized by high, early compressive and shear strength. More specifically, the multi-component grouting system comprises in weight percent from about 10 to about 30 percent basic material such as magnesium oxide, from about 1 to about 10 percent alumina trihydrate, about 1 to 10 percent dolomite as a reactive filler, from about 10 to 25 percent of a dihydrogen phosphate salt such as sodium dihydrogen phosphate or mono ammonium dihydrogen phosphate, from about 1 to about 50 percent sand filler, from about 1 to about 3 percent organic dispersant, and from about 2 to about 10 percent of a combination of trisodium phosphate together with a second agent selected from the group consisting of a polyphosphate salt or alkyl acid phopsphate or both.

DESCRIPTION OF PRIOR ART AND FIELD OF INVENTION

Rock reinforcement using organic resin bonded bolts has been used in mining and construction for over ten years and is now an established practice. Typically, the resin comprises an unsaturated polyester mastic together with a benzoyl peroxide catalyst, both being contained in a frangible package, either in separate compartments as described in U.S. Pat. No. 4,009,778 or chemically interfaced as described in U.S. Pat. No. 3,731,791, the disclosures of which are incorporated herein by reference for all purposes.

While the aforementioned method of reinforcement functions are perfectly satisfactory, certain of the constituents in the cartridge prior to activation have a relatively low flash point range (from 105° F.–150° F.), are relatively expensive chemicals derived from petroleum sources and are difficult to formulate for long shelf life requirements especially in high ambient temperatures.

The constituents of the present invention do not suffer from any of the above disadvantages, while at the same time possessing the properties of quick setting, high strength and non-corrosiveness.

Prior art relating to the reaction of basic oxides and specifically magnesium oxide, with phosphoric acid and its salts is to be found in U.S. Pat. Nos. 3,285,758, 3,821,006, 3,879,209, 3,923,525, 3,923,534, 3,960,580 and 4,152,167. All patents deal either with refractory repair compositions or concrete patching mortars, and do not readily lend themselves to adaption for rock bolting use.

The present invention provides compositions of the various reactive and non-reactive constituents in the form of stable pastes which may be conveniently handled in high speed cartridge filling machinery and packaged in cartridge form, and which when brought together result in an easily mixed and fast setting cementitious mass characterized by exceptionally high, early compressive and shear strengths.

SUMMARY OF INVENTION

The present invention provides fast acting inorganic adhesive systems in combination with rock bolts for effective rock stabilization. The hardened cementitious mass locking the bolt in place is the reaction product combining the two components of the adhesive system. The first component of the inorganic grouting adhesive comprises a paste of a refractory grade magnesium oxides, a dispersing agent, e.g. a ligno sulfonate, and water. The second component comprises mono ammonium dihydrogen phosphate or sodium dihydrogen phosphate together with trisodium phosphate in combination with a polyphosphate, or alkyl acid phosphate or both, and water.

The principal reactions involved in the present invention are given by the following equation:

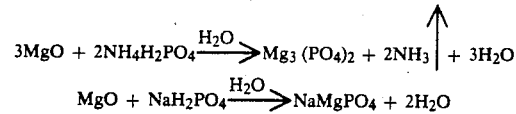

$$3MgO + 2NH_4H_2PO_4 \xrightarrow{H_2O} Mg_3(PO_4)_2 + 2NH_3\uparrow + 3H_2O$$

$$MgO + NaH_2PO_4 \xrightarrow{H_2O} NaMgPO_4 + 2H_2O$$

The resulting magnesium phosphate is a very hard cementitious mass and has the potential to give the required strength properties for anchor bolt applications in rock reinforcement. Some free water remains entrapped in the mass after reaction and since wet phosphates do not exhibit good physical properties, the amount of water used in the reaction plays an important role in dictating the strength properties of the product in the initial stages of cure.

It is, therefore, a feature of this invention to demonstrate the feasibility of preparing pumpable pastes of the two components containing the minimum quantity of water necessary to achieve this purpose, and to impart the required rheology and strength for successful installation of anchor bolts.

Of the potential basic oxides usable in this invention, namely alkaline earth metal oxides capable of reacting with the phosphate components, ground calcined refractory grade magnesia is preferred. Again, because of the special requirements for maximum utility of this invention, the magnesia should have a moderate activity defined by a bulk density in the range 20 to 210 pounds per cubic foot and preferably 50 to 100 pounds per cubic foot, and a surface area in the range 0.5 $m^2/g$. up to 8 $m^2/g$. The preferred magnesia is further characterized by having a loss on ignition of less than 3.5 percent, and having minimum fluxing impurities of $SiO_2$, $Fe_2O_3$, $Na_2O$, and $CaO$. For instance, it is preferred that $CaO$ be present in an amount less that 1 percent. The ground calcined magnesia should be 95 percent passing 200 mesh sieve. A magnesium oxide usable in the present invention is sold by the Martin Marietta Company under the Trademark Mag Chem 10 which is 97 percent MgO, 1 percent maximum CaO and 0.5 percent maximum of all other impurities.

All these factors together or in part contribute also to a low water requirement necessary in order to obtain a workable paste. It should be noted from the previous equation that while water is involved in the chemical reaction, it is not used up in the chemical reaction. Moreover, the low water requirement is further facilitated by the incorporation of a dispersing agent such as a ligno sulfonate, which has water reducing properties while also contributing to a smooth pumpable paste. Furthermore, the presence of a suitable dispersing agent facilitates fast mixing of the reactive components, thus contributing to easy installation of the anchor bolt, when spun through the cartridge. A still further advantage of the inclusion of such a dispersing agent is the thixotropy imparted to the final mixed product prior to setting hard. This latter property is important in preventing loss of material in overhead installations such as placing anchors for mine roof support. Without the presence of a dispersing agent, the final mixture before setting off is very mobile and unsuitable for vertical or overhead application.

As previously noted, the preferred basic material is magnesia. The preferred form of magnesia is ground calcined magnesia. However, the basic material may also be deadburned magnesite of natural or synthetic origin or deadburned dolomite.

Suitable dispersing agents include water soluble ligno sulfonates, naphthalene sulfonates or melamine formaldehyde polymers. For example, Marasperse (American Can), Tamol S. N. (Rhom and Haas), Melment (American Hoechst), Dispersol T. (I.C.I.). Such dispersants may be present from about 1 percent to 3 percent of the total composition.

It is advantageous to include in the first component, a quantity of filler containing a latent source of oxides capable of reacting with the phosphate ion of the second component. Suitable materials include graded raw dried dolomite or alumina trihydrate, present in amounts from 1 to 10 percent of total weight, and preferably from 5 to 10 percent of the total weight of the system.

The remaining filler consists of a well-graded sand from 20 mesh through 200 mesh (Tyler sieve) and comprises from 5 to 50 percent and preferably 10 to 30 percent of the total weight of the total composition.

The dihydrogen phosphate salt present in the second component is preferably in powdered form for maximum and immediate interaction with the magnesia in the first component. Equally important is the contribution made to the rheology of the second component by using sodium dihydrogen phosphate or mono ammonium phosphate in powdered form. Typically, the particle sizing should be 2 to 10 percent on 100 mesh, 15 to 35 percent on 200 mesh and 40 to 60 percent on 325 mesh.

The proportion of sodium dihydrogen phosphate or mono ammonium phosphate in the total composition should be between 5 to 30 percent, and preferably 10 to 25 percent.

In the practice of this invention, it has been found desirable for achieving higher strength to include from 2 10 percent of the total weight of a combination of trisodium phosphate and polyphosphate salts or an alkyl acid phosphate together with the mono ammonium phosphate or sodium dihydrogen phosphate. The polyphosphate may be water soluble or difficultly water soluble so long as solvated ions are formed to allow the reaction to proceed. Also, the polyphosphate may be sufficiently water dispersable to form solvated ions.

It has been found that trisodium phosphate in combination with polyphosphates or an alkyl acid phosphate, or both, exhibits a marked synergism not previously observed. The term polyphosphate includes, preferably any water soluble polymerized phosphate compound with chain lengths containing two or more phosphorus units. In the preferred practice of the invention, polyphosphates having two and three chain units are used characterized by the general formula $M_{n+2}P_nO_{3n+1}$. For example, sodium tripolyphosphate $M_5P_3O_{10}$, M being a cation and n is an integer of 2 or 3. The term alkyl acid phosphate includes a mixture of mono and dialkyl acid phosphates (phosphate esters) containing also condensed phosphates, hereinafter referred to as alkyl acid phosphate, are used characterized by the general formula:

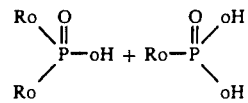

Where R is methyl, ethyl, butyl amyl, or stearyl.
For example ethyl acid phosphate.

Apart from the alkyl acid phosphate, all of the above named phosphate salts are normally only available in granular form. It is found necessary therefore to incorporate these by intimate mixing with the monoammonium dihydrogen phosphate or sodium dihydrogen phosphate followed by a suitable grinding procedure for maximum effectiveness.

The inclusion of the combination trisodium phosphate with either a polyphosphate salt or an alkyl acid phosphate allows the maximum strength properties of the magnesium phosphate reaction to be realized. This is brought about by forming a cross linked network of polyphosphates resulting in superior wetting properties, compressive and shear strengths. It is theorized that the trisodium phosphose functions as a reaction promoter. Alternatively, tripotassium phosphate may be used in lieu of trisodium phosphate.

In the practice of this invention, the preferred phosphate blend is the combination of trisodium phosphate with the alkyl acid phosphate. This allows the minimum water requirement to (a) produce a pumpable paste, and (b) which as before mentioned is essential to obtain early strength gain in the initial stages of cure. The preferred alkyl phosphates are those prepared from the interaction of either methyl, ethyl or propyl (1 to 3 carbon atoms) alcohols with phosphorus pentoxide. The resulting mixture contains about equimolar quantities of mono alkyl and dialkyl phosphates, together with small quantities of condensed phosphates. It is believed that these condensed phosphates contribute markedly to the overall strength gain, by interacting with the magnesia, forming a cross-linked network of polyphosphates.

While the preferred compounds disclosed hereinabove are sodium compounds, it is contemplated that corresponding lithium and potassium compounds may be used in the practice of these inventions.

The reaction is carried out at atmospheric pressure in the following manner: Into a three necked flask fitted with a dropping funnel, condenser, and stirrer and immersed in a water bath at 0° C., is placed 20 parts of anhydrous phosphorus pentoxide. Into the dropping funnel is placed 15.8 parts of ethyl alcohol, and allowed into the flask by dropwise addition with stirring. The flow of alcohol is controlled to allow the initial reaction to subside. The remainder is then added in a small stream while stirring is continued for a further one hour. While the reaction is complete in about thirty minutes, further stirring is essential in order to achieve a homogeneous clear syrup. The above procedure not only ensures for the formation of both mono and diethyl phosphates, but also provides for a slight excess of phosphorus pentoxide for the best results, with no uncombined alcohol remaining in the reaction mixture. The alkyl acid phosphates are manufactured by both Stauffer Chemicals and Hooker Chemical companies. The mono ethyl acid phosphate has a density of 11.8 pounds per gallon, a boiling point of 225° F., an average molecular weight of 126, $P_2O_5$ content of 56 percent, and a typical acid number of 892. The N-butyl phosphate has a density of 10.25 pounds per gallon, a boiling point of 360° F., an average molecular weight of 182, $P_2O_5$ content, 39.1 percent by weight, and a typical acid number of 462.

The mixture of mono and dialkyl acid phosphates (phosphate esters) so formed generally has a viscosity between 100 and 2000 centipoise and preferably between 500 and 1500 centipoise.

As before mentioned, the high early strength necessary for the application of this invention for structural support requires that the total water content be as low as possible, and that the inclusion of alkyl and phosphate greatly helps in this respect.

Generally, the total water content should be between 3 and 20 percent of the total weight of the composition, and preferably between 6 and 10 percent of the total weight. This is split between the basic oxide and binder components in such a way that both components result in pastes suitable for manufacture of cartridges or may be delivered to the anchor hole premixed in place using the anchor bolt for such purposes.

Another significant improvement over prior art using acid phosphate binders is the relatively mild acid pH resulting from intermixing the components of the binder. As stated above, the preferred method of manufacture is to first integrate the two phosphate salts, namely, mono ammonium dihydrogen phosphate and trisodium phosphate, then add the polyphosphate or the alkyl acid phosphate, followed by the sand or other optional unreactive fillers, and finally add water, generally amounting to about 1 percent of the total weight of the composition. The resulting slurry has a pH 4.8.

The advantage to be obtained by using the improvements embodied in this invention may be illustrated by way of the following examples:

EXAMPLE 1

A two-component reacting system was made of the following composition:

| PARTS BY WEIGHT | |
|---|---|
| Component A | |
| Magnesium Oxide | 30 |
| Sodium Lignosulfonate | 2 |
| Water | 7 |
| Component B | |
| Monoammonium Phosphate | 17.5 |
| Tri Sodium Phosphate | 5 |
| Ethyl Acid Phosphate | 4 |
| Water | 1.5 |

The magnesium oxide was of 98 percent purity, −200 mesh (smaller than 200 mesh), a high density, (65 pounds per cubic feet) refractory grade material, with a loss on ignition of less than 0.50 percent.

After thoroughly mixing the two components, a cylindrical mold 1⅜"×1.0" was filled, for compressive strength testing, and also a ⅞"×⅞" nut was filled for shear strength determination. The mixture set hard within ten minutes.

The compressive and shear strengths were measured after two (2) hours, and resulted in a compressive strength of 510 psi and shear strength of 1870 psi.

The shear strength was measured on a Baldwin Testing Machine by placing the nut over a hollow steel cylinder and measuring the force necessary to dislodge the grout plug within the nut using a steel plunger ⅝" diameter.

EXAMPLE II

| PARTS BY WEIGHT | |
|---|---|
| Component A | |
| Magnesium Oxide | 30 |
| Dolomite | 15 |
| Sodium Lignosulfonate | 2 |
| Water | 7 |
| Component B | |
| Monoammonium Phosphate | 17.5 |
| Tri Sodium Phosphate | 5 |
| Ethyl Acid Phosphate | 4 |
| Dolomite | 15 |
| Water | 1.5 |

The only difference in Example II is the inclusion of dolomite which is a graded kiln dried dolomitic limestone (Ohio Lime 220×80 mesh). A two (2) hour compressive strength of 1465 psi and a shear strength of 3230 psi, showed the benefit to be derived by adding dolomite as a source of reactive filler.

Since the presence of dolomite in component B results in only a short shelf life due to interaction with the phosphate, it is preferable to substitute a graded sand filler in component B, and include dolomite only in component A, as in the following example:

EXAMPLE III

| PARTS BY WEIGHT | |
|---|---|
| Component A | |
| Magnesium Oxide | 30 |
| Dolomite | 15 |
| Sodium Lignosulfonate | 2 |
| Water | 6.5 |
| Component B | |
| Monoammonium Phosphate | 17.5 |
| Tri Sodium Phosphate | 5 |
| Ethyl Acid Phosphate | 4 |
| Sand | 25 |
| Water | 2 |

A sand having well rounded grains is required having a uniform gradation. A sand complying to this requirement was the Central Silica company's 100 mesh sand, graded 83 percent between 300 microns and 75 microns with a mean particle size of 150 microns, 95.5 percent passing a 50 mesh sieve.

The compressive and shear strengths were measured at different intervals over a three day period with the following results:

| TIME INTERVAL | COMPRESSIVE STRENGTH (psi) | SHEAR STRENGTH (psi) |
|---|---|---|
| 2 hours | 1780 | 4730 |
| 24 hours | 2670 | 6070 |
| 3 days | 3310 | 7080 |

This demonstrates the further improvements made in the strength of the final hardened product by including a graded sand, together with dolomite.

A one inch diameter hold drilled into high strength concrete to a depth of six inches was filled with freshly mixed magnesium phosphate grout corresponding to Example II, and a deformed number six streel bar was thrust full depth into the grout filled hole. The grout hardened within five minutes. After two (2) hours, the bar was attached to a hydraulic jack and an upward force applied to the bolt. The test was discontinued at a reading of 18 ton on the dial gauge, since elongation of the bar was observed. This corresponds to a pull out strength of 3 tons per inch.

EXAMPLE IV

This Example involves four comparative tests. Test (a) of this Example is a composition in accordance with the present invention. Test (b) employs a similar composition, except ethyl acid phosphate is omitted and an equivalent amount of phosphoric acid is used in its place. In test (c), both ethyl acid phosphate and phosphoric acid are omitted. In test (d), there was ommitted lignosulfonate, phosphoric acid and ethyl acid phosphate.

Both components A and B in test (a) were of the same composition as in the previous example except that a coarser grade of well rounded sand was chosen, namely, Central Silica Company's number 7 grade. This sand has a grain size distribution of 99.6 percent between 600 microns and 150 microns with a mean particle size of 300 microns, and 50 percent passing a 50 mesh sieve.

A steel bar pull-out test was carried out in a similar manner to the previous example, using a number 6 bar in a one inch diameter hole six inches deep in high strength concrete. On this occasion, the bar was placed under continuous tension within one hour of installation by tightening down a nut onto a bearing plate and collar placed over the threaded bar, using a torque wrench.

After one month of outdoor exposure, a pull-out test was carried out when the bolt was taken to failure at 20 tons.

Table 1 summarizes a series of runs carried out which further illustrates the contribution made by the individual components in the grout formulation on the compressive and shear strengths of the hardened mass.

TABLE 1

| | (a) | (b) | (c) | (d) |
|---|---|---|---|---|
| Component A | | | | |
| Magnesium Oxide | 30 | 30 | 30 | 30 |
| Dolomite | 15 | 15 | 15 | 15 |
| Sodium Lignosulfonate | 2 | 2 | 2 | — |
| Water | 6.5 | 6.5 | 6.5 | 8 |
| Component B | | | | |
| Mono ammonium phosphate | 17.5 | 17.5 | 17.5 | 17.5 |
| Tri sodium phosphate | 5 | 5 | 5 | 5 |
| Phosphoric Acide (85%) | — | 4 | — | — |

TABLE 1-continued

| | (a) | (b) | (c) | (d) |
|---|---|---|---|---|
| Ethyl Acid Phosphate | 4 | — | — | — |
| Sand Central Silica #7 | 25 | 25 | 25 | 25 |
| Water | 1 | 1 | 3 | 3 |
| Compressive Strenght (psi) - 2 hours | 2100 | 980 | 1270 | 890 |
| Shear strength (psi) - 2 hours | 5000 | 3670 | 3130 | 3000 |

(a) Same composition as used in Example IV for pull out test.
(b) Ethyl acid phosphate omitted and an equivalent amount of phosphoric acid used.
(c) Both ethyl acid phosphate and phosphoric acid omitted.
(d) No sodium lignosulfonate, phosphoric acid, or ethyl acid phosphate. Additions of water were made in runs (c) and (d) in order to compensate for the components omitted and to maintain a workable paste.

Summarizing the results, it is seen in test (b) that omitting ethyl acid phosphate and substituting phosphoric acid (85%) results in a reduction in compressive strength, and shear strength of 58 percent and 26 percent respectively, compared to run (a). Removing both phosphoric acid and ethyl acid phosphate in test (c) results in reductions of 40 percent and 38 percent respectively in compressive and shear strengths compared to run (a). Run (d) demonstrates how sodium lignosulfonate assists indirectly in attaining maximum strength as a water reducing agent, since by its omission, compressive and shear strengths are reduced 30 percent and 50 percent respectively.

EXAMPLE V

To determine the effectiveness of a range of alkyl acid phosphates, a selection of commercially available products was studied using the same formulation as in Example III other than substituting the appropriate alkyl acid phosphate in Component B, namely at four (4) parts by weight.

| | After 2 hours Cure Time | |
|---|---|---|
| | COMPRESSIVE STRENGTH (psi) | SHEAR STRENGTH (psi) |
| (1) Mono Ethyl Acid Phosphate | 1210 | 2570 |
| (2) Mono Iso Octyl Acid Phosphate | 1530 | 2470 |
| (3) Methyl Acid Phosphate | 1590 | 4600 |
| (4) N-Butyl Acid Phosphate | 1530 | 2730 |
| (5) Stearyl Acid Phosphate | 1020 | 2600 |
| (6) Ethyl Acid Phosphate | 1780 | 4730 |
| Set Time in every case 6 to 7 minutes | | |

(1) and (2) Manufactured by Stauffer Chemicals
(3), (4) and (5) Manufactured by Hooker Chemicals
(6) Laboratory Prepared as described in script.
Both (1) and (2) are predominently mono ester.
(3), (4), (5) and (6) contain approximately equi molar amounts of mono and di esters, together with small amounts of condensed phhates.

From these results, it is noted that the lower alkyl groups of the mixed mono and di acid esters are preferred.

EXAMPLE VI

Of the usable fillers in Component A containing basic oxides, other than magnesium oxide, capable of reacting with the phosphates in Component A, two were selected for comparison purposes: namely, Raw Kilned Dried Dolomite (Ohio Lime 20×80 mesh) and Ground Aluminum Trihydrate (Aluchem Inc.). Each of these fillers was run in Component A according to the formulation in Exhibit III with the following results:

| FILLER | COMPRESSIVE STRENGTH(PSI) | | | | | SHEAR STRENGTH(PSI) | | | | |
| --- | --- | --- | --- | --- | --- | --- | --- | --- | --- | --- |
| | ½HR. | 1HR. | 2HR. | 24HR. | 3DAYS | ½HR. | 1HR. | 2HR. | 24HR. | 3DAYS |
| DOLOMITE | 1530 | 1780 | 1780 | 2670 | 3310 | 2670 | 4100 | 4730 | 6070 | 7800 |
| ALUMINUM TRIHYDRATE | 1270 | 1340 | 1590 | 2040 | 3120 | 1770 | 4300 | 3430 | 4270 | 6070 |

These results show that Dolomite is somewhat more effective in gaining a high early strength, although in time these differences are not so apparent, in which case both fillers are equally effective.

EXAMPLE VII

The beneficial synergistic effect resulting from the combination of trisodium phosphate with polyphosphates or an alkyl acid phosphate is shown in Tables 2A and 2B.

TABLE 2A

| | (a) | (b) | (d) | (d) | (e) |
| --- | --- | --- | --- | --- | --- |
| COMPONENT A | | | | | |
| Magnesium oxide | 30 | 30 | 30 | 30 | 30 |
| Dolomite | 15 | 15 | 15 | 15 | 15 |
| Sodium Lignosulfonate | 2 | 2 | 2 | 2 | 2 |
| Water | 6.5 | 6.5 | 6.5 | 6.5 | 6.5 |
| COMPONENT B | | | | | |
| Mono ammonium phosphate | 17.5 | 17.5 | 17.5 | 17.5 | 17.5 |
| Tri sodium phosphate | 7 | — | — | — | 5 |
| Sodium Tri polyphosphate | — | 7 | — | — | 2 |
| Tetrasodium pyrophosphate | — | — | 7 | — | — |
| Ethyl acid Phosphate | — | — | — | 7 | — |
| Sand Central Silica #7 | 25 | 25 | 25 | 25 | 25 |
| Water | 3 | 3 | 3 | 3 | 3 |
| Compressive Strength (psi) | 1530 | 2150 | 1900 | 1020 | 2990 |
| Shear Strength (psi) | 1400 | 5330 | 3930 | 2400 | 6000 |

TABLE 2B

| | (f) | (g) | (h) | (i) | (j) | (k) |
| --- | --- | --- | --- | --- | --- | --- |
| COMPONENT A | | | | | | |
| Magnesium Oxide | 30 | 30 | 30 | 30 | 30 | 30 |
| Dolomite | 15 | 15 | 15 | 15 | 15 | 15 |
| Sodium Lignosulfonate | 2 | 2 | 2 | 2 | 2 | 2 |
| Water | 6.5 | 6.5 | 6.5 | 6.5 | 6.5 | 6.5 |
| COMPONENT B | | | | | | |
| Mono ammonium phosphate | 17.5 | 17.5 | 17.5 | 17.5 | 17.5 | 17.5 |
| Tri sodium phosphate | 5 | 5 | — | — | — | — |
| Sodium tri polyphosphate | — | — | 2 | 5 | 5 | — |
| Tetrasodium pyrophosphate | 2 | — | 5 | 2 | — | 5 |
| Ethyl acid phosphate | — | 2 | — | — | 2 | 2 |
| Sand Central Silica #7 | 25 | 25 | 25 | 25 | 25 | 25 |
| Water | 3 | 3 | 3 | 3 | 3 | 3 |
| Compressive Strength (psi) | 1850 | 2420 | 1400 | 2040 | 1850 | 1400 |
| Shear Strength (psi) | 5700 | 5330 | 1530 | 2000 | 3560 | 3400 |

It is postulated that the highly basic trisodium phosphate induces the polyphosphate chains to break open into individual phosphorus units. This exposes more reaction sites to the magnesia, leading to enhanced cementing action.

EXAMPLE VIII

An adhesive grouting composition was prepared as in Example II using sodium dihydrogen phosphate instead of monoammonium phosphate in the same proportions, with the following results:

| Cure Time | Compressive Strength (psi) | Shear Strength (psi) |
| --- | --- | --- |
| 2 hours | 1400 | 1870 |
| | (1465) | (3230) |

For comparison the figures in brackets are those obtained when using monoammonium phosphate in the equivalent amount.

In all of the foregoing tests, shear strength is most important since the primary purpose of the present invention is for rock reinforcement and mine roof support in the mining and construction industries.

Without further elaboration, the foregoing will so fully illustrate our invention that others may, by applying current or future knowledge, readily adapt the same for use under various conditions of service.

What is claimed as the invention is:

1. A cartridge having first and second separate compartments respectively containing first and second components adapted to be mixed together just prior to use, said first component being a paste including 10 to 30% by weight of total system of magnesium oxide and 1 to 3% by weight of total system of a dispersing agent, said second component being a paste including 10 to 25% by weight of total system of a dihydrogen phosphate salt and 2 to 10% by weight of total system of a combination of trisodium phosphate and a second agent selected from the group consisting of a polyphosphate salt and an alkyl acid phosphate or both, the balance being at least one filler and other ingredients.

2. The cartridge of claim 1, wherein the first component further includes at least one reactive filler.

3. The cartridge of claim 2, wherein the reactive filler is selected from the group consisting of dolomite and trihydrate of alumina.

4. The cartridge of claim 3, wherein the filler further includes a non-reactive filler.

5. The cartridge of claim 1, wherein said dihydrogen phosphate salt is sodium diydrogen phosphate.

6. The cartridge of claim 1, wherein the dihydrogen phosphate salt is mono ammonium dihydrogen phosphate.

7. The cartridge of claim 1, wherein said second component includes a non-reactive filler.

8. The cartridge of claim 1, wherein the magnesium oxide has a bulk density at least 50 pounds per cubic foot, a loss on ignition of less than 3.5 percent and CaO less than 1 percent, and comprises about from 5 to 35 percent of the total weight of the grouting composition.

9. The cartridge of claim 2, including as a filler, trihydrate of alumina which comprises about from 1 to 15 percent of the total weight of the composition.

10. The cartridge of claim 1, including as a filler sand which comprises about from 10 to 50 percent of the total weight of the compositions, and preferably having a grading from 50 microns through to 450 microns.

11. The cartridge of claim 1, including as a filler dolomite which is preferably a raw kiln dried dolomite, graded between −20 mesh and −100 mesh, and comprising about from 1 to 15 percent of the total weight of the composition.

12. The cartridge of claim 1, wherein the dispersing agent comprises a dispersing agent selected from the group consisting of refined varieties of ligno sulfonates, naphthalene sulfonates and a condensate of melamine and formaldehyde, comprising about from 1 to 3 percent of the total weight of the composition.

13. The cartridge of claim 6, wherein the dihydrogen phosphate salt is mono ammonium dihydrogen phosphate in powered form from +100 mesh to −325 mesh and comprising about from 10 to 25 percent of the total weight of the composition.

14. The cartridge of claim 1, wherein the polyphosphate salt is selected from the group consisting of disodium hydrogen phosphate, tirsodium phosphate, sodium tripolyphosphate and tetrasodium pyrophosphate and comprising about from 2 to 10 percent of the total weight of the composition.

15. The cartridge of claim 6, wherein the mono ammonium dihydrogen phosphate and the trisodium phosphate are intimately mixed.

16. The cartridge of claim 1, wherein the alkyl group of the alkyl acid phosphate is selected from the group consisting of methyl, ethyl, propyl, or butyl, and comprises the reaction products from equimolar amounts up to 0.01 to 0.05 molar excess of phosphorus pentoxide and either methyl, ethyl, propyl or butyl alcohol.

17. The cartridge of claim 16, wherein the alkyl acid phosphate comprises equimolar quantities of mono and di acid ester, together with small amounts of condensed phosphates and comprises from about 1 to 6 percent of the total weight of the composition.

18. The cartridge of claim 1, wherein the second component has a pH greater than 4.5.

19. The cartridge of claim 1, including optional non-reactive fillers selected from the group consisting of tricalcium phosphate and calcium hydrogen phosphate and comprising about from 1 to 15 percent of the total weight of the composition.

20. The cartridge of claim 1, including water which constitutes from about 6 to about 15 percent of the total composition, and is proportioned between said first component and said second component in such a way that each component results in a smooth paste.

21. The cartridge of claim 1, wherein said second component is water soluble.

22. The cartridge of claim 1, wherein said second agent is sufficiently water dispersable to from solvated ions.

23. A grouting composition produced from mixing together first and second components, said first component being a paste including 10 to 30% by weight of total system of magnesium oxide and 1 to 3% by weight of total system of a dispersing agent, said second component being a paste including 10 to 25% by weight of total system of a dihydrogen phosphate salt and 2 to 10% by weight of total system of a combination of trisodium phosphate and an agent selected from the group consisting of a polyphosphate salt and an alkyl acid phosphate or both, the balance being at least one filler and other ingredients.

24. A method of bolting for securing an anchor to a surface comprising drilling a hole, introducing into said hole a cartridge having first and second separate compartments respectively containing first and second components, mixing said components together, introducing a bolt so that when said adhesive system sets, said bolt will be tightly held thereby, said first component being a paste including 10 to 30% by weight of total system of magnesium oxide and 1 to 3% by weight of total system of a dispersing agent, said second component being a paste including 10 to 25% by weight of total system of a dihydrogen phosphate salt and 2 to 10% by weight of total system of a combination of trisodium phosphate and an agent selected from the group consisting of a polyphosphate salt and an alkyl acid phosphate or both, the balance being at least one filler and other ingredients.

25. The cartridge of claim 4 wherein said filler is sand.

26. The cartridge of claim 15 wherein said phosphates are preground before incorporation into said second component.

* * * * *